United States Patent
Durand et al.

(10) Patent No.: US 9,359,084 B2
(45) Date of Patent: Jun. 7, 2016

(54) AVIONICS CARGO HOLD MODULE HAVING AN UPPER INTEGRATED FLOOR

(71) Applicant: Airbus Operations (SAS), Toulouse (FR)

(72) Inventors: Yves Durand, Aussonne (FR); Bernard Guering, Montrabe (FR)

(73) Assignee: AIRBUS OPERATIONS SAS, Toulouse (FR)

(*) Notice: Subject to any disclaimer, the term of this patent is extended or adjusted under 35 U.S.C. 154(b) by 140 days.

(21) Appl. No.: 14/138,588

(22) Filed: Dec. 23, 2013

(65) Prior Publication Data

US 2014/0175226 A1 Jun. 26, 2014

(30) Foreign Application Priority Data

Dec. 21, 2012 (FR) ...................... 12 62592

(51) Int. Cl.
*B64C 1/00* (2006.01)
*B64D 43/00* (2006.01)
*B64C 1/18* (2006.01)
*B64F 5/00* (2006.01)

(52) U.S. Cl.
CPC . *B64D 43/00* (2013.01); *B64C 1/18* (2013.01); *B64F 5/0009* (2013.01); *B64C 2001/009* (2013.01); *Y10T 29/49826* (2015.01)

(58) Field of Classification Search
CPC ...... B64C 2001/00; B64C 1/18; B64C 1/068; B64F 5/0009
See application file for complete search history.

(56) References Cited

U.S. PATENT DOCUMENTS

| | | | | |
|---|---|---|---|---|
| 4,089,040 | A * | 5/1978 | Paulsen | 361/691 |
| 4,153,225 | A * | 5/1979 | Paulsen | 244/118.1 |
| 6,808,142 | B2 * | 10/2004 | Oki | 244/118.1 |
| 7,193,850 | B2 * | 3/2007 | Pal | 361/700 |
| 8,011,617 | B2 * | 9/2011 | Curry et al. | 244/118.1 |
| 8,702,036 | B2 * | 4/2014 | Curry et al. | 244/118.1 |
| 8,979,025 | B1 * | 3/2015 | Curry et al. | 244/118.1 |
| 2002/0148928 | A1 * | 10/2002 | Oki | 244/118.1 |
| 2012/0126056 | A1 * | 5/2012 | Curry et al. | 244/118.1 |
| 2012/0298337 | A1 * | 11/2012 | Tiwari et al. | 165/104.26 |
| 2013/0084792 | A1 * | 4/2013 | Guering et al. | 454/76 |

FOREIGN PATENT DOCUMENTS

FR 2960514 12/2011

OTHER PUBLICATIONS

French Search Report, Aug. 7, 2013.

* cited by examiner

*Primary Examiner* — Philip J Bonzell
(74) *Attorney, Agent, or Firm* — Greer, Burns & Crain, Ltd.

(57) ABSTRACT

An integral avionics bay module. The module has a structure that has an integral cabin floor on top that closes the structure. Installing such an integral avionics bay structure in a single operation inside a primary fuselage structure considerably reduces the integration time on the final assembly line for the aircraft.

30 Claims, 6 Drawing Sheets

AVIONICS CARGO HOLD MODULE HAVING AN UPPER INTEGRATED FLOOR

CROSS-REFERENCES TO RELATED APPLICATIONS

This application claims the benefit of the French patent application No. 1262592 filed on Dec. 21, 2012, the entire disclosures of which are incorporated herein by way of reference.

BACKGROUND OF THE INVENTION

The invention relates to an avionics bay module, to an aircraft nose incorporating such a module, and to a method of integrating such a nose.

Figure 1:
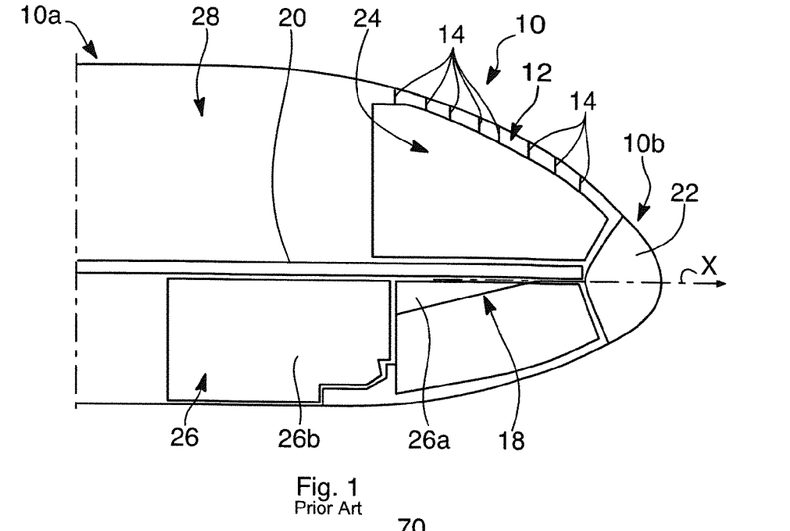
FIG. 1 (described above) is a general diagrammatic view in longitudinal section of an aircraft nose of the prior art.

FIG. 1 shows a nose of a prior art aircraft 10, which nose includes a primary fuselage structure 12.

The primary structure 12 comprises in particular a plurality of fuselage frames 14 arranged parallel to one another along the longitudinal axis X of the nose. Only the top portions of the fuselage frames 14 are shown for reasons of clarity.

The structure 12 also has a well 18 for storing the nose landing gear (not shown) of the aircraft.

The primary fuselage structure 12 defines a space inside the structure that is to be fitted out.

More particularly, a cabin floor 20 extends longitudinally from the rear end 10a of the nose to a radome zone 22 situated at the front end 10b of the nose.

The floor 20 subdivides the inside space for fitting out into an upper space and a lower space.

A zone dedicated to the cockpit 24 is for fitting out in the upper space above the wheel well 18.

A zone dedicated to an avionics bay 26 is for fitting out in the lower space. This zone comprises a zone referred to as a "front" zone 26a including the wheel well 18 (under the cockpit zone 24) and a zone referred to as a "rear" zone 26b situated behind the wheel well, under the floor 20 of the upper space 28, which is dedicated to a passenger cabin.

Fitting out the rear zone 26b can take a relatively long time. The avionics racks and the avionics systems incorporating electrical and/or electronic equipment are put into place one by one in the zone in question and subsequently they are interconnected (electricity, air, . . . ) and they are also connected to electrical systems and air pipe systems installed in the primary structure 12.

The various above-mentioned tasks require a relatively long period of integration time on the assembly line for the nose. It would be advantageous to be able to shorten this integration time.

SUMMARY OF THE INVENTION

To this end, the present invention provides an avionics bay module, characterized in that it comprises an avionics bay structure of longitudinal axis for installing in a single operation in a primary fuselage structure of an aircraft, the avionics bay structure having an integral floor in its top portion.

The floor already integral with the top of the structure of the module serves to reduce the overall integration time of the aircraft when the structure of the module (prepared away from the final assembly line of the aircraft) is installed in a primary fuselage structure.

The integral floor of the structure also makes it possible for the module to be more compact and to increase the usable space inside the module for installing racks and equipment therein.

The floor thus forms an integral portion of the avionics bay structure (module) even before it is installed in the primary fuselage structure. The floor carried by the avionics bay structure can thus be connected to the floor that is already present in the primary fuselage structure. The floor of the avionics bay structure is connected to the location where the floor is voluntarily and locally interrupted in the primary structure for the purpose of receiving the avionics bay structure together with its floor.

Prior to being installed in the primary fuselage structure, the avionics bay structure comprises in particular an assembly of racks enabling it to receive various pieces of electrical and/or electronic equipment together with most of that equipment (some predetermined amount defined in advance when designing the module) already installed in the racks together with interconnections between these pieces of equipment, and also ventilation system elements (air ducts, couplings, . . . ).

Thus, the module may be installed in a single operation in the primary structure where previously the avionics bay racks for receiving the various pieces of equipment dedicated to the avionics bay used to be installed rack by rack on the final assembly line and where the pieces of equipment and the interconnections between them were then put into place after the racks had been installed. Once the module is installed it is thus almost ready for use, apart in particular from adding the last pieces of equipment (e.g., avionics computers, . . . ) and the last connections (electricity, air) inside the module and also with corresponding systems associated with the primary fuselage structure.

The saving in time obtained during this operation also makes it possible to reduce the overall integration time on the final assembly line of the aircraft.

According to one possible characteristic, the avionics bay structure comprises a plurality of elements fastened to one another so as to form an assembly that is suitable for being moved as a unit.

The structure of the bay module is thus made up of an assembly of elements (racks, pieces of electrical and/or electronic equipment, interconnection elements between those pieces of equipment, ventilation system elements, . . . ) that are connected or assembled together in such a manner as to give the assembly mechanical cohesion that enables it to be handled as a single physical entity or object.

These various elements are arranged in an unchanging predetermined configuration which is the configuration they are to have once the module is integrated in a primary fuselage structure of an aircraft.

According to one possible characteristic, the avionics bay structure presents a longitudinal dimension and a transverse dimension perpendicularly to its height, the floor having in cross-section a plurality of floor segments including a central segment and two lateral segments arranged on either side of the horizontal central segment, each of the lateral segments being suitable for being hinged relative to the central segment in such as a manner as to be capable of adopting firstly a horizontal, deployed position in which all of the segments are in alignment, and secondly a folded position in which each lateral segment forms an angle other than 180° with the central segment.

This hinged floor makes it easier to install the avionics bay module in the primary fuselage structure by temporarily reducing the outside dimensions of the bay module while its lateral floor segments are in the folded position.

According to other possible characteristics that may be taken in isolation or in combination with one another:

the floor has a top portion forming a surface for walking on and a bottom portion that is structural;

the structural bottom portion comprises a set of cross-members, at least some of which that extend in a horizontal transverse direction are for connecting to the primary fuselage structure;

the avionics bay structure incorporates an assembly of avionics racks receiving electrical and/or electronic equipment;

the avionics bay structure comprises two submodules supporting the floor and arranged on either side of a vertical midplane including the longitudinal axis of the avionics bay structure; the floor and the submodules thus form a one-piece mechanical structure that is easy to manipulate, the two submodules generally being symmetrical in particular for reasons of equipment redundancy;

the two submodules are separated from each other by a central passage of longitudinal axis for access to the submodules; the passage serves in particular to provide a floor surface to enable installation and/or maintenance personnel to have easy access to each submodule;

each submodule comprises a row of avionics racks receiving electrical and/or electronic equipment in alignment along the longitudinal axis of the avionics bay structure, the two rows of racks being disposed facing each other and spaced apart from each other;

each row of racks comprises a plurality of racks arranged side by side and spaced apart in pairs by structural vertical transverse support uprights, the transverse uprights of the two rows being respectively arranged facing one another; these uprights serve to support the mechanical load of the racks; each row of racks thus forms a structural lateral block;

the floor is mounted to be supported on each of the vertical transverse uprights of the two rows of racks; these uprights, in addition to their function of providing the avionics racks with mechanical strength, also serve to support the mechanical load received by the floor and to transmit the forces as received in this way to the primary structure to which they are fastened in the lower portion of the bay structure;

the floor is fastened to each of the vertical transverse uprights of the two rows of racks via two support elements that are transversely spaced apart from each other; this arrangement serves to reduce the bending force to which the structural portion (cross-member(s)) of the floor may be subjected, and thus to adapt its shape accordingly, e.g., by reducing the height of this structural portion;

one of the two support elements is of the flexible support type and, of the two support elements, constitutes the support element that is closer to the flexible support element of the transverse upright facing the opposite row of racks; the presence of a flexible support serves to reduce the bearing area of the cross-member in question, and thus to limit bending, without connecting the racks in statically indeterminate manner to the cross-members in question;

the floor is mounted to be supported on each of the vertical transverse uprights of the two rows of racks; this arrangement serves to relieve the floor assembly of forces to which it might be subjected; and the avionics bay structure incorporates a vertical transverse partition fastened to the two submodules at one end of the two opposite longitudinal ends of said structure; this partition also participates in providing mechanical cohesion to the entire structure by securing the two submodules together.

The invention also provides an aircraft nose comprising a primary fuselage structure, the nose being characterized in that it includes an avionics bay module comprising an avionics bay structure incorporated inside the primary fuselage structure, the avionics bay structure having an integral floor in its top portion.

The floor carried by the avionics bay structure is already integral therewith before it is installed as a module in the primary fuselage structure.

By way of example, the module is installed behind the well for storing the nose landing gear, in a zone of the fuselage where its cross-section is substantially constant.

Nevertheless, such a module may be installed anywhere along the fuselage, and in particular in a zone of cross-section that is quasi-constant.

According to other possible characteristics taken in isolation or in combination with one another:

the nose comprises, inside the primary fuselage structure, an aircraft cabin floor that is locally interrupted, the avionics bay structure being incorporated in the primary fuselage structure in such a manner that the floor integral with said avionics bay structure locally extends the aircraft cabin floor;

the primary fuselage structure has a plurality of fuselage frames arranged parallel to one another in cross-sections that are spaced apart along the longitudinal axis of the nose, the floor integral with the avionics bay structure including at least one cross-member in correspondence with a plurality of frames and, for each of the frames in the plurality of frames, at least one cross-member that extends in the same transverse direction as the frame and that connects together two opposite points of said frame; such an arrangement enables the forces to which the frames are subjected to be taken up via said at least one cross-member and the avionics bay structure;

the avionics bay structure incorporates a set of avionics racks for receiving electrical and/or electronic equipment, said at least one cross-member in correspondence with each frame being fastened to one or more racks of the set of avionics racks; the forces taken up by said at least one cross-member are thus transmitted to the racks of the structure;

the set of avionics racks comprises a plurality of vertical transverse uprights, each lying between two racks arranged side by side and each extending in the same transverse cross-section as one of the frames of the plurality of frames, said at least one cross-member in correspondence with said frame being fastened to the associated vertical transverse upright; the forces taken up are thus transmitted in each transverse section between the frame in question of the fuselage and the structural support uprights of the racks; and the avionics bay structure presents a longitudinal dimension and a transverse dimension perpendicularly to its height, the floor integral with the avionics bay structure having in cross-section a plurality of floor segments including a central horizontal segment and two lateral segments arranged on either side of the central segment, each of the lateral segments being suitable for being hinged relative to the central segment in such as a manner as to be capable of adopting firstly a horizontal deployed position in which all of the segments are in alignment, and secondly a folded position in which each lateral segment forms relative to the central segment an angle that is not equal to 180°; in the deployed position, the floor presents a transverse dimension corresponding substantially to the transverse dimension between the opposite inside edges of the fuselage frames to which the lateral floor segments are fastened; this arrangement in the horizontal deployed position is made possible because the floor integral with the avionics bay structure is partially folded (reducing its transverse overall size) during the operation of installing it in the nose.

The invention also provides a method of integrating an aircraft nose, the nose comprising a primary fuselage structure that defines a space for fitting out inside said structure, the space being opened at the rear end of the nose, the method being characterized in that it comprises the following steps:

inserting an avionics bay module in a longitudinal direction via the rear end of the nose, the module comprising an avionics bay structure that has a floor integral with its top portion;

moving the avionics bay module inside the primary fuselage structure towards the front end of the nose until reaching a location reserved for receiving said avionics bay module; and fastening the module to the primary fuselage structure.

According to other characteristics taken in isolation or in combination with one another:

inside the primary fuselage structure, the aircraft nose includes an aircraft cabin floor that extends horizontally from the rear end of the nose towards the front end, the cabin floor being locally interrupted at a free end of the floor that is arranged at the rear of the location reserved for the avionics bay module;

the avionics bay module is moved:

horizontally over the cabin floor until it reaches a position situated beyond the free end of the floor and over an opening situated in register with the space reserved for said module; and then vertically through said opening in order to reach its location in which the floor integral with the avionics bay structure extends the cabin floor forwards;

in cross-section, the floor integral with the avionics bay structure comprises a plurality of floor segments including a central segment and two lateral segments on either side of said horizontal central segment, each of the two lateral segments being hingeable relative to the central segment, the avionics bay module being inserted inside the nose with the two lateral segments folded into a position in which each of them forms relative to the central segment an angle that is not equal to 180°, the module being moved while in this position along a portion of its path; and during vertical movement of the avionics bay module, the method includes a step of deploying the lateral floor segments so that the lateral segments become aligned with the central segment.

It should be observed that the above-described method (in particular the various steps and characteristics set out above) applies equally well to integrating a bay module in an aircraft, in a reserved location that is not necessarily in the nose of the aircraft. It is possible to install such a module anywhere along the fuselage of the aircraft, and in particular in a zone of cross-section that is quasi constant (e.g., behind the wing on the lower deck).

BRIEF DESCRIPTION OF THE DRAWINGS

Other characteristics and advantages of the invention appear in the following description made by way of non-limiting illustration and with reference to the accompanying drawings, in which:

FIG. 6b is a diagrammatic view in longitudinal section of a flexible support element 102a, 102b of FIG. 6a;

DETAILED DESCRIPTION OF THE PREFERRED EMBODIMENTS

Figure 2:
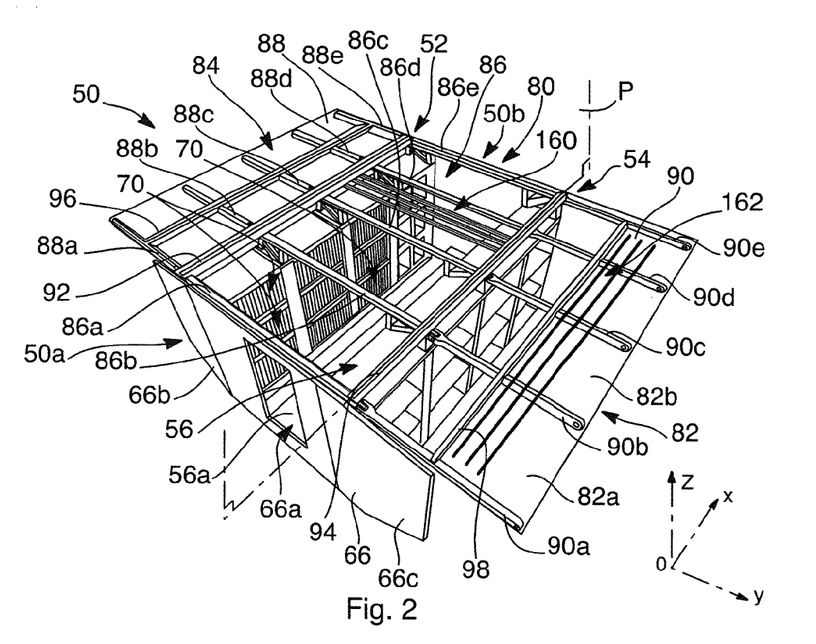
FIGS. 2 and 3 are diagrammatic overall views of an avionics bay module in an embodiment.
Figure 3:
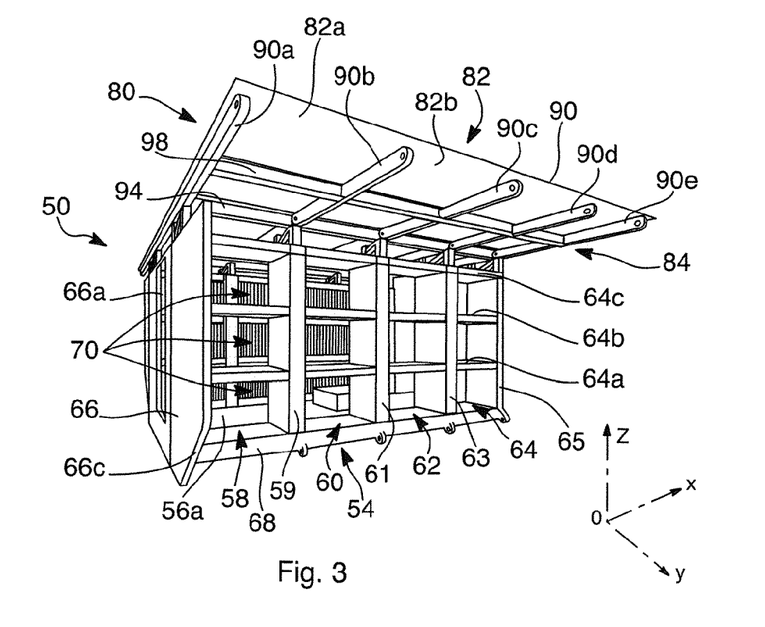

As shown from different viewpoints in FIGS. 2 and 3, an avionics bay module 50 in an embodiment of the invention is made in the form of an avionics bay structure.

In general, this avionics bay structure comprises a plurality of elements fastened together so as to form an assembly that is suitable for being moved as a unit. The elements are connected or assembled together so as to confer mechanical cohesion to the assembly enabling it to be handled as a single physical object or entity.

More particularly, the avionics bay structure includes integrated in the module specifically all of the racks for receiving the various pieces of electrical and/or electronic equipment (electrical master boxes, computers, . . . ) dedicated to the avionics bay, and also most of the equipment mounted on those racks (a predetermined number of pieces of equipment as defined in advance when designing the module), the interconnections between these pieces of equipment, and also ventilation system elements (air ducts, couplings, . . . ), . . . .

The structure of the bay module is thus made up of an assembly of elements (racks, electrical and/or electronic equipment, elements providing interconnections between these pieces of equipment, elements of ventilation systems, . . . ) that are arranged in a fixed predetermined configuration that is the configuration they are to have once the module has been incorporated in a primary aircraft fuselage structure.

The structure mainly comprises two submodules 52 (left) and 54 (right) that are arranged symmetrically on either side of a longitudinal vertical midplane P, which is also identified in the OXYZ geometrical reference frame as the plane XOZ.

The axis X is the longitudinal axis of the module 50 and, once installed in an aircraft; it coincides with the longitudinal axis of the fuselage of the aircraft.

The axis Y is transverse and defines the width direction of the module 50 (cross-section of the fuselage of the aircraft).

The axis Z is the vertical axis defining the height direction of the module 50.

The two submodules 52, 54 are separated from each other by a central passage 56 aligned along the longitudinal axis X of the module.

In its low portion, the passage 56 has a floor 56a for walking on to give access to both submodules. This floor extends mainly in the XOY plane and is at a low height up the axis Z.

Each submodule 52, 54 comprises a row of avionics racks aligned along the longitudinal axis X. The two mutually parallel rows are thus arranged facing each other on each of two opposite sides of the central passage 56.

Each row of racks comprises a plurality of racks, e.g., identical racks, that are arranged side by side.

As shown in FIG. 3 for the right submodule 54 (with the configuration of the left submodule 52 being the same), the racks 58, 60, 62, and 64 of the row, e.g., four such racks, are separated from one another in pairs by vertical transverse uprights (each situated in the YOZ plane) providing structural support to two adjacent racks (i.e., a mechanically strong structural element for the racks). In this example, a row has five uprights, with only four of them 59, 61, 63, 65 being shown, since the fifth, 57 (visible in FIG. 6a) is masked by a partition 66 that is described below.

The racks as constituted in this way are said to be "structural" and they are used for transmitting forces via the transverse uprights.

This makes it possible to avoid having recourse to vertical external structural rods for taking up some or all of these forces. Such structural rods constitute impediments for moving and/or installing equipment and they increase on-board weight.

The row of racks also includes a common bottom shelf or horizontal base 68 to which the transverse uprights 59, 61, 63, 65 of all of the racks in the row are fastened, and shelves that are superposed one above another and fastened between two consecutive transverse uprights.

Thus, for example, the end rack 64 has three superposed shelves 64a, 64b, and 64c in addition to the common bottom shelf 68. The top shelf 64c closes the top portion of the rack.

The structure of the other racks 58, 60, and 62 is identical to that of the rack 64, and the same applies to the rack of the other row opposite.

Nevertheless, in a variant that is not shown, within a given row, the structure of the rack may vary from one rack to another or only some of them vary. It should be observed that in this variant the vertical uprights of the rack in the two rows face one another in pairs. Furthermore, the shelves of the racks in the two rows are arranged at the same respective heights.

The symmetry of the structure of the racks from one row to another is nevertheless conserved, e.g., for reasons of equipment redundancy between the left submodule and the right submodule.

The transverse uprights of a submodule are arranged respectively facing the corresponding transverse uprights of the other submodule.

The racks constituted in this way are racks having shelves that are used for receiving the various pieces of electrical and/or electronic equipment that are needed in the avionics bay.

Such pieces of equipment 70 are shown in the installed position on the shelves of the racks of the left submodule 52 in the background of FIGS. 2 and 3. It should be observed that a predetermined number of these pieces of equipment (and generally most of them) are put into place in the racks before the module is installed in the aircraft. Certain pieces of equipment (e.g., avionics computers) are nevertheless put into place only after the module has been installed.

As mentioned above, the structure of the module 50 incorporates a vertical transverse partition 66 (in the YOZ plane) that is fastened to both of the submodules 52 and 54.

Figure 6A:
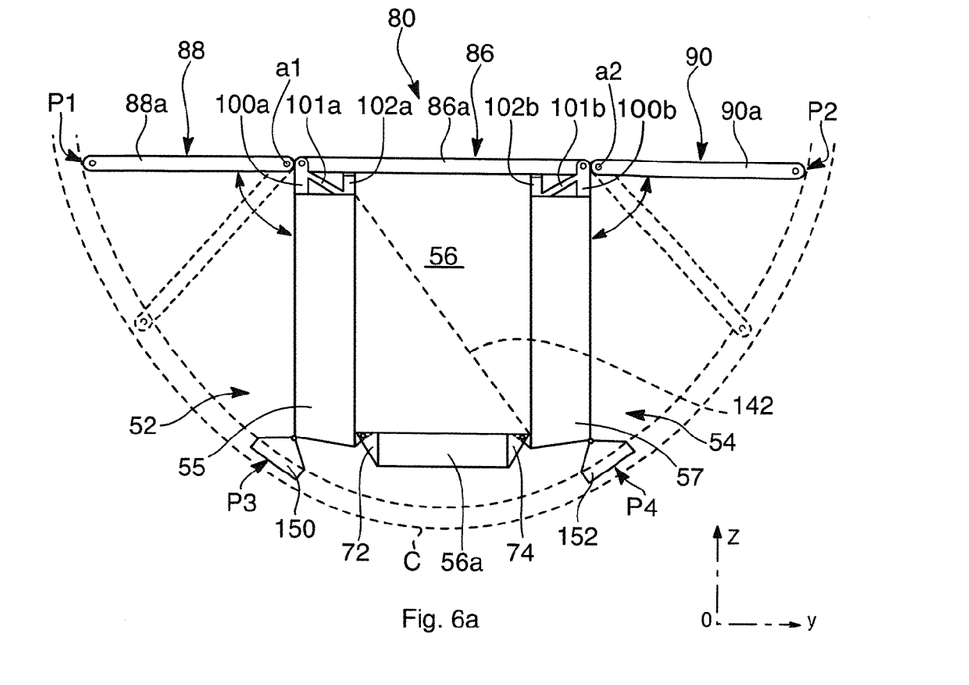
FIG. 6a is a cross-section view of the avionics bay module of FIGS. 2 to 5.

More particularly, this partition 66 is mounted directly on the large transverse faces of the two vertical transverse uprights 55, 57 situated at one of the ends 50a of the two opposite ends 50a and 50b of the structure of the module 50 that are spaced apart from each other along the longitudinal axis X. These two uprights 55 and 57 are shown in FIG. 6a.

The partition 66 thus contributes to stiffening the structure by linking together the two submodules, thus making the structure easier to handle while it is being installed in the primary aircraft fuselage structure.

The partition 66 is substantially leaktight and it separates the cargo hold situated behind it (space 136 in FIGS. 7 and 8) from the avionics bay module. This partition provides flame resistance in order to reduce the risks of fire in the cargo hold. The partition also has rapid decompression panels that open in the event of an accident, thereby enabling pressures to be balanced between these two zones.

A central opening 66a (FIGS. 2 and 3) is formed in the partition in alignment with the central passage 56 so as to enable personnel to enter the module and also to leave it.

The transverse dimension or width of the central opening 66a and of the central passage 56 is designed to allow a person to pass through.

The height of this central opening may nevertheless be less than the average height of a person for reasons of available vertical space.

It should be observed that the rows of racks are spaced apart from each other as far as possible in order to release efficient empty working space in the central passage (in order to enable the equipment 70 to be handled, in particular for maintenance purposes), and also to achieve as much safety as possible for systems that are redundant from one row of racks to the other.

The partition 66 has lateral panels with profiled bottom free ends 66b, 66c (e.g., chamfered ends) so as to match the shape of the primary structure of the fuselage of the aircraft within which the module is to be integrated. This shape is imparted in particular by the (concave) curved shape of the fuselage frames C (FIGS. 4, 5, 6a).

Figure 4:
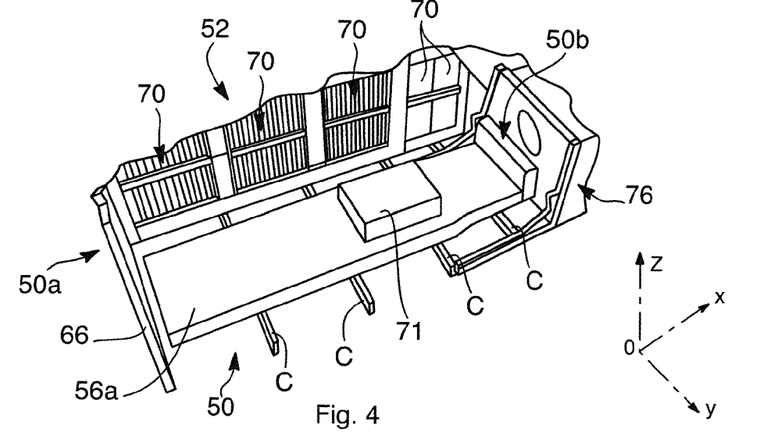
FIG. 4 is a fragmentary perspective view of the inside of the avionics bay module of FIGS. 2 and 3.
Figure 5:
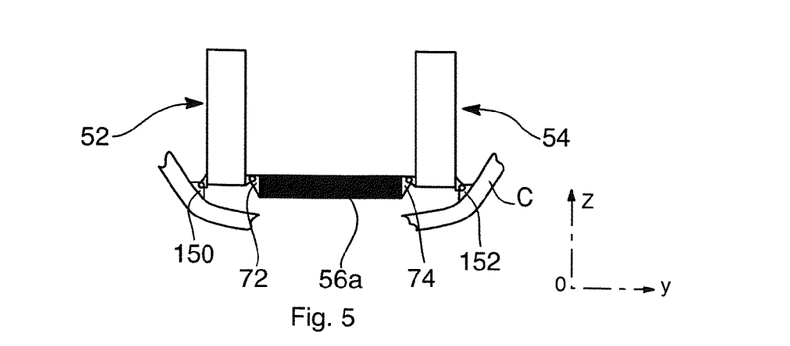
FIG. 5 is a very diagrammatic view in cross-section of the avionics bay module of FIGS. 2 to 4.

FIGS. 4 and 5 are diagrams showing the arrangement and the fastening of the floor 56a of the central passage 56 relative to the racks of the submodules 52 and 54.

As shown in the fragmentary view in perspective of FIG. 4 and in the diagrammatic cross-section of FIG. 5, the central passage 56 extends between the racks of the left and right submodules 52 and 54.

A seat 71 is provided on the top face of the floor 56a for use by personnel.

The floor is fastened to the racks of the two submodules in the low portions thereof by means of rigid fasteners 72, 74 (FIG. 5), such as metal fittings that are spaced apart from one another along the length of the passage. More particularly, the fasteners are fastened to the common bottom shelf of each row of racks, in register with the vertical transverse uprights of the racks.

The floor 56a is held at a distance from the racks by the rigid fasteners and it extends longitudinally between the transverse partition 66 common to both submodules and situated at the rear of the module, and the front end 50b of the module (FIG. 4).

In FIGS. 4 and 5, the structure of the avionics bay 50 is shown in its environment after being installed in the aircraft.

The front end 50b of the structure 50 is arranged adjacent to the rear end of a well 76 for storing the nose landing gear (not shown) of the aircraft.

Parallel fuselage frames C of the primary structure of the fuselage of the aircraft are also shown in part.

The structure of the avionics bay module 50 also includes in its top portion a floor 80 that constitutes a ceiling and that closes the top of the structure, thereby stiffening the two submodules relative to each other.

The floor 80 is shown in perspective in FIGS. 2 and 3 and in cross-section in FIG. 6a. In FIG. 6a, the partition 66 is omitted for greater clarity and a fuselage frame C is shown in dashed lines in order to illustrate the environment in which the module 50 is installed.

In general manner, the floor 80 comprises a top portion 82 constituting a surface for walking on made up of a plurality of panels 82a, 82b, e.g., made of composite material, and assembled together (FIGS. 2 and 3). Underneath it also has a structural portion 84 made up of a set of transversely extending cross-members for taking up exerted forces via the fuselage frames. The cross-members are mounted on the racks of the submodules in the manner described below.

As shown in general manner in FIG. 2, the floor 80 integral with the structure comprises a plurality of floor segments, each having a top portion forming a portion of the surface for walking on (panels 82a, 82b, . . . ) and an underlying bottom portion formed by cross-members and longitudinal rails.

More particularly, the floor 80 has a stationary horizontal central segment 86 and two lateral segments 88 and 90 arranged on either side of the central segment (FIGS. 2 and 6a). In FIG. 6a, the panels that form the surface for walking on and that rest on the cross-members are omitted for reasons of clarity.

The two lateral segments 88, 90 are hinge-mounted relative to the stationary central segment 86 so as to enable them to adopt two positions (FIG. 6a):
- a horizontal, deployed position, shown in continuous lines in FIG. 6a, in which the lateral segments 88, 90 are in alignment with the central segment (this position is adopted when the module 50 is installed in the location reserved for it inside the primary fuselage structure); and
- a folded position, drawn in dashed lines, in which the lateral segments 88, 90 are folded towards the lateral flanks of the racks of the submodules, each forming an angle other than 180° relative to the central segment 86 (this position is adopted when the module 50 is in the process of being installed inside the primary fuselage structure, as described below with reference to FIGS. 9a to 9g).

It should be observed that the central floor segment 86 comprises, under its top portion for constituting the surface for walking on, a set of central cross-members 86a to 86e that are parallel to one another and disposed respectively in register with the vertical transverse uprights of the racks in the two submodules (FIG. 2).

The stationary central floor segment 86 that overlies the two rows of racks serves to stiffen the structure, which is useful in particular during stages in which the module is being handled.

The floor 80 also has two stationary rails or length members 92, 94 extending perpendicularly to the central cross-members 86a to 86e, above the two respective rows of racks.

Under its top portions dedicated to the surface for walking on, each of the lateral floor segments 88, 90 has a respective set of lateral cross-members 88a to 88e or 90a to 90e, which are arranged respectively in the same cross-sections as the central cross-members 86a to 86e (FIG. 2). The lateral cross-members thus act as top connecting rods for taking up forces laterally.

Each of the lateral cross-members 88a to 88e and 90a to 90e is hinge-mounted to pivot about a longitudinal axis crossing a respective one of the two opposite ends of the central cross-members 86a to 86e. Such hinge axes a1 to a2 are shown in FIG. 6a. The connection between the lateral cross-members and the stationary central cross-member in alignment provides cross-member continuity, thus enabling the two opposite sides of the fuselage to be connected together in order to take up forces due to pressurization.

It should be observed that each of the lateral floor segments 88, 90 also has a respective rail or length member 96, 98.

The rails 92, 94, 96, and 98 serve to stiffen the structural portion of the floor longitudinally, and also to transfer the load of passenger seats that are fastened to the rails in the plane of the floor.

As shown in FIGS. 2, 3, and 6a, the central floor segment 86 is mounted to be supported on each of said racks of the two submodules, more particularly via two spaced-apart support elements arranged in register with each of the vertical transverse uprights (FIG. 3).

In FIG. 6a, the first transverse uprights 55 and 57 of the two rows of racks are shown together with the two support elements fastened to their top portions, the other uprights and support elements being identical and hidden because they are situated in the background.

The two support elements furthest apart from each other are rigid supports 100a, 100b that are obtained for example by using fastener fittings (of the clevis-and-lug type) of the same type as the fastener elements 72 and 74 of the floor 56a.

Two intermediate support elements 102a, 102b of the flexible type or mounted on elastomer are provided to support each central cross-member 88a to 88e at two additional points.

Figure 6B:
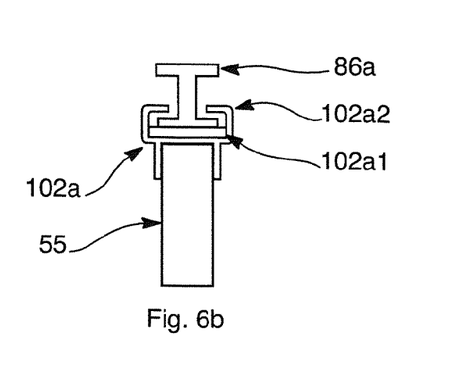

One such flexible support element 102a is shown diagrammatically in longitudinal section in FIG. 6b.

The support element 102a (like the support element 102b) comprises an elastomer block or pad 102a1 on which the foot of the central cross-member 86a is supported.

The support element 102a also has a flange 102a2 having a horizontal central portion from which there extend vertically both a bottom portion and a top portion. The flange is fastened on the rack upright 55 by its downwardly extending bottom portion, and its upwardly extending top portion forms a rim extending over the foot of the cross-member 86a while leaving vertical clearance relative thereto. The elastomer block 102a1 is interposed between the horizontal central portion of the flange and the foot of the cross-member 86a.

The flange mounted with clearance around the flexible support serves to limit to some extent upward movement of the central cross-member 86a.

The additional flexible support serves to limit the bending force to which the central cross-member may be subjected, and thus to reduce the height of the cross-member without giving rise to horizontal stresses.

When normally loaded, only the spaced-apart support elements 100a and 100b are stressed and contribute to supporting the integral floor.

In the event of accidental additional loading, the integral floor deforms to a greater extent, so the cross-members also deform to a greater extent and the intermediate flexible support elements 102a and 102b become loaded and contribute to providing the assembly with mechanical strength. The central cross-member of the floor is thus held better by means of the additional supports 102a, 102b. The bearing area of the cross-member is adapted to the load that is supports. Since the cross-member is thus loaded less heavily, it may be made lighter.

It should be observed that the support elements 100a and 100b are fastened to the central cross-member 86a at points that are distinct from the respective hinge axes a1 and a2 for hinge-mounting of the lateral cross-members.

This arrangement is easier to make than making a single part (that would be more complicated and more bulky) for uniting on a common axis both the hinge point of the lateral cross-member and the fastener point of the support element 100a, 100b.

It is also simpler to dismantle the floor in part when using two distinct fastener points.

Sloping stiffener elements 101a and 101b are provided between the respective pairs of support elements 100a, 102a on one side and 100b, 102b on the other. These additional elements provide the stiffness needed along the transverse axis Y in order to prevent deformation of the support elements in the event of acceleration along the axis Y.

Figure 7:
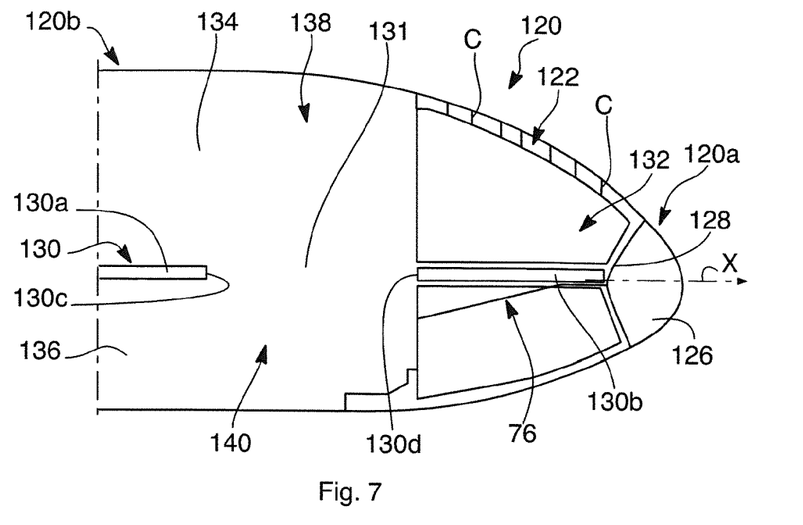
FIG. 7 is a diagrammatic view in longitudinal section of an aircraft nose in an embodiment.

FIG. 7 is a highly diagrammatic view of an aircraft nose having an avionics bay that is to be integrated therein in one embodiment of the invention.

As shown diagrammatically in FIG. 7 and given overall reference 120, the nose of the aircraft has a primary fuselage structure 122.

In particular, the primary structure 122 comprises:
  a plurality of mutually parallel fuselage frames C that are arranged longitudinally along the nose, along the longitudinal axis X of the nose (the frames being shown in part for clarity); and
  a well 76 for storing nose landing gear (not shown) of the aircraft.

At a front end 120a, the nose 120 has a housing for a radome zone 126 defined by a radome partition 128, and its rear end 120b is open.

The nose 120 also has a cabin floor 130 that extends from the open rear end 120b longitudinally towards the front end. The cabin floor 130 is interrupted over a distance D between a rear floor portion 130a and a front floor portion 130b each of which is terminated by a respective free end 130c, 130d. Between them, the free ends 130c and 130d define an opening 131.

A cockpit zone 132 is arranged over the front floor portion 130b.

The rear floor portion 130a lies in the height direction between the internal volume or space of the primary structure 122 for fitting out as a rear upper space 134, and a rear lower space 136. Beyond the free end of the floor 130a, these spaces are united with an overall front free space 138 for fitting out.

A lower location 140 is reserved in the overall free space 138 in register with the opening 131 in order to receive an avionics bay therein.

The avionics bay module 50 described above with reference to the figures and fitted with the assembly of structural elements (racks), with electrical and/or electronic equipment, with ventilation system elements (ducts, couplings, . . . ), and with interconnection elements (for electricity, air, . . . ), . . . is to be installed therein in application of a method constituting an implementation of the invention.

Prior to inserting the module 50 in the nose 120, the two submodules 52 and 54 are assembled together in temporary manner by means of tooling that mainly comprises support rods.

Such rods are shown very diagrammatically in dashed lines in FIG. 6a. A single rod 142 is shown, the other rods not being visible because they are arranged in a common alignment.

Each rod is fastened between two facing respective structural support uprights of the two opposite rows of racks. The rods are in a sloping arrangement so as to subdivide the space of the central passage 56 between the rows into two non-deformable triangles as seen in the cross-section view of FIG. 6a. Such an arrangement thus makes it possible to prevent the two submodules from moving relative to each other.

It should be observed that the rods arranged obliquely are not necessarily provided for each pair of facing structural support uprights, but that they could be farther apart.

Prior to inserting the module 50 in the nose 120, the lateral floor segments 88 and 90 are folded into the sloping low position shown in dashed lines in FIG. 6a and they are held temporarily in this closed position during a portion of the duration of installing the module. In this position, the hinge floor of the avionics bay structure presents, in cross-section, a profile that is of trapezoid shape and that is substantially complementary (and in any event generally close) to the concave shape of the top portion (ceiling) of the primary fuselage structure. This position for transporting the module thus matches the inside shape of the fuselage so as to avoid interfering therewith while it is moving.

It should be observed that the lateral floor segments are held in this position, e.g., by means of tooling formed by simple rods connecting the segments to the uprights of the racks.

FIGS. 8 and 9a to 9g show a method of integrating or installing the module 50 as prepared in this way in the nose 120 until it occupies the location 140 reserved therefore.

For this purpose, a traveling crane (not shown in FIG. 8) is put into place with its rails arranged inside the primary structure 122 in its upper portion. The rails are fastened to the fuselage frames C and they extend up to the location 140.

Figure 8:
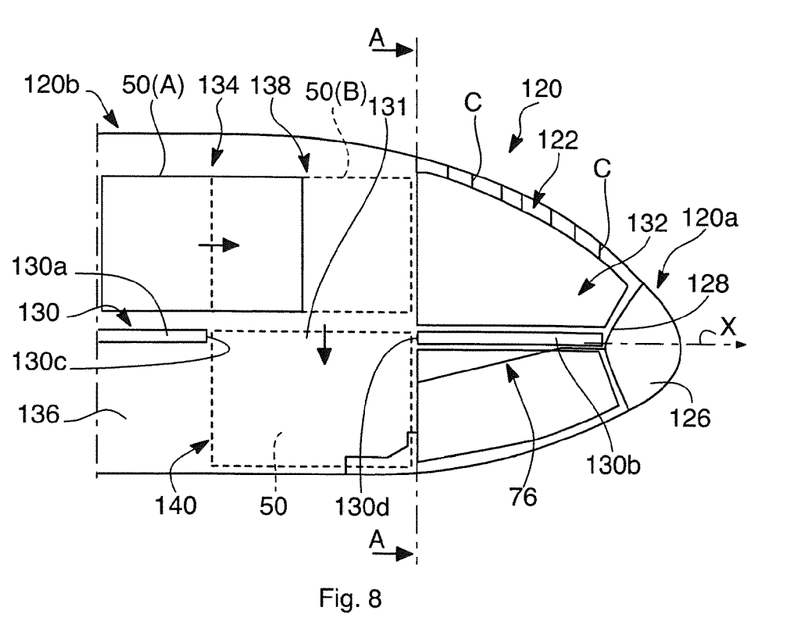
FIG. 8 shows steps of installing an avionics bay module as shown in the view of FIG. 7.

The avionics module 50 is attached by cables to wheels mounted on the rails of the traveling crane and it is inserted into the upper space 134 via the open rear end 120b of the nose.

The module 50 occupying the position 50(A) over the rear cabin floor portion 130a is then moved in translation towards the front end 120a as represented by the horizontal arrow (FIG. 8), while being kept spaced apart from the floor and from the top portions of the frames C.

The movement in translation is substantially horizontal (along the longitudinal axis X) until the intermediate position 50(B) is reached overlying the opening 131 (shown in dashed lines in FIG. 8).

Figure 9A:
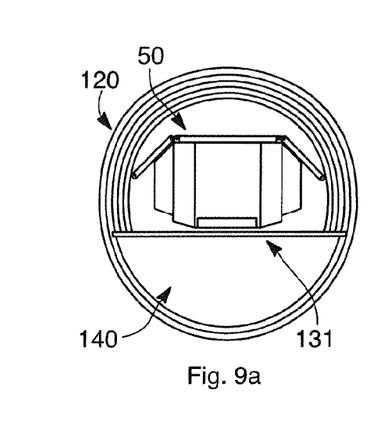
FIGS. 9a to 9g show other steps of installing the module in cross-section views of the aircraft nose.
Figure 9B:
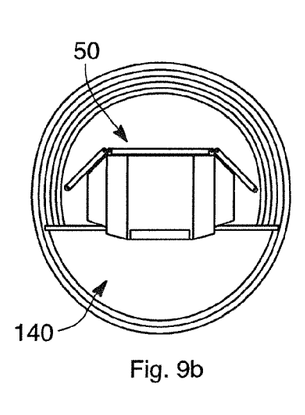
Figure 9C:
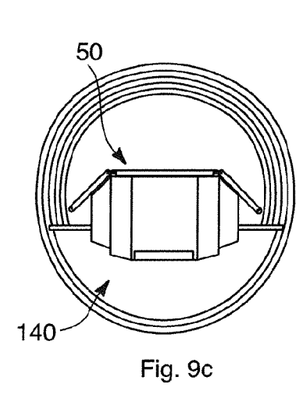
Figure 9D:
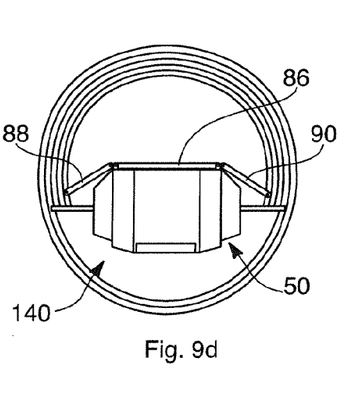
Figure 9E:
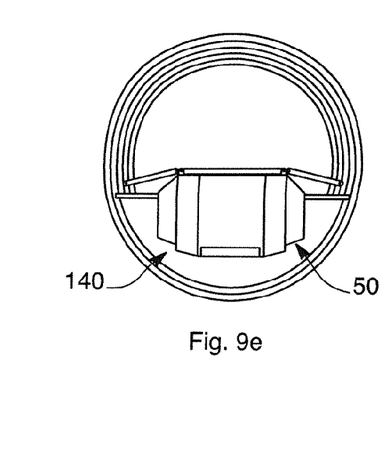
Figure 9F:
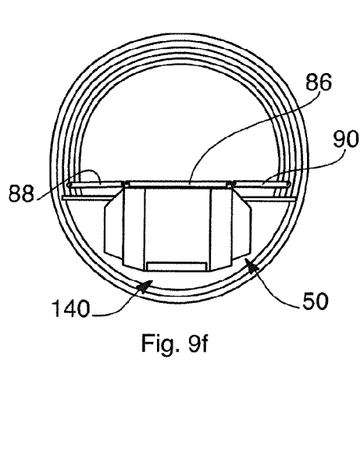
Figure 9G:
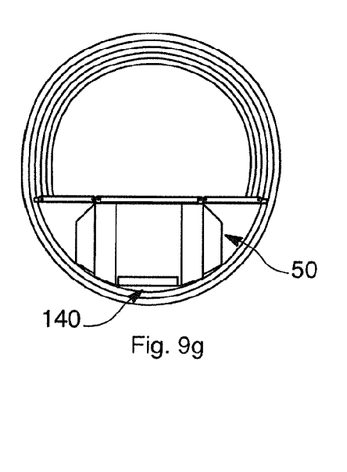

The various successive FIGS. 9a to 9g, in cross-section view (AA) of FIG. 8, show a sequence of installing the module 50 from its intermediate position 50(B) (FIGS. 8 and 9a) to its final, installed position (FIGS. 8 and 9g).

The module 50 is thus lowered vertically through the opening 131 (FIGS. 9a to 9c). Thereafter, the lateral segments 88, 90 begin to deploy like the wings of a bird (FIG. 9d). The lateral segments continue to rise as the module descends until they reach the fully-deployed horizontal position (FIG. 9f) in which the central and lateral floor segments 86 and 88, 90 are mutually in alignment (open position).

By way of example, the deployment movement may be performed manually. Alternatively, it may be performed by appropriate tooling installed beside each of the lateral segments or by an actuator system raising each lateral segment progressively as the module descends.

In the position of FIG. 9f, the module is spaced apart from the bottom of the primary fuselage structure so as to make it possible to prepare for docking the module with the various structural elements of the primary structure.

The downward movement comes to an end in FIG. 9g when the module has reached the location 140 reserved therefore (FIG. 8).

It should be observed that in this position (FIG. 9g), the integral floor, once deployed, occupies the entire width or transverse dimension of the fuselage, with this being possible only because the floor can be folded (retracted) in part during the handling stage.

In this installed position, the floor integral with the module 50 and that acts as a ceiling for the module fits perfectly in the opening 131 and thus locally extends the two portions 130a and 103b of the cabin floor.

The cabin floor integral with the module provides an increase in space available for fitting out inside the module compared with a configuration in which the module is positioned under a cabin floor that is permanently fastened in place.

With such a configuration, it would be necessary to provide vertical clearances between the permanent cabin floor and the module so as to enable the module to be installed under the floor. Such clearances would represent a loss of volume for integrating equipment in the module. The racks forming portions of the structure are thus of a height that, depending on requirements, can be greater than that of racks integrated in a module for installation under a permanently fastened floor.

Furthermore, the floor integral with the module enables the module to be put into place via the cabin space (upper space 134 in FIGS. 7 and 8), thus providing a larger passage than would be available if it had to pass through the cargo space (lower space 136).

The presence of structural racks (mechanically strong racks) in the structure of the module makes it possible by using these racks for support to make use of cross-members that are relatively short (FIG. 6a) and that can therefore be small in height compared with the height of the cross-members of a conventional cabin floor.

This arrangement also makes it possible to further increase the usable height of the volume within the module.

The module 50 is then fastened to the primary fuselage structure, in its upper portion via the floor and in its lower portion via the two submodules. More particularly, and as shown in FIG. 6a, each free end of each of the lateral cross-members 88a to 88e, 90a to 90e of the lateral segments 88, 90 is fastened to a point on a fuselage frame C that lies in the same cross-section.

Fastening may be performed for example by means of metal fittings (not shown).

The two fastening points P1 and P2 of a frame are two opposite points in horizontal alignment.

The module is also fastened to the bottom portion of each frame C via fasteners positioned as close as possible to the frames insofar as there is no need to leave free space available in this bottom zone. By way of example, the fasteners are fittings 150, 152 that are attached at two horizontally-aligned fastener points P3, P4. The two symmetrical submodules are thus held independently of each other to the primary fuselage structure.

The module 50 is thus fastened in statically indeterminate manner in the YOZ plane to the primary fuselage structure via all of the fuselage frames along which the module extends. The rigid zones of the racks (vertical transverse uprights) thus correspond to rigid zones of the fuselage (the frames) and they are connected thereto via the central and lateral cross-members of the integral floor.

On being installed, the module 50 has the racks for receiving the various pieces of equipment (for performing the functions that need to be performed by a conventional avionics bay) already forming integral portions of the structure of the module so there is no need for them to be installed subsequently, thereby greatly reducing the integration time in the final assembly line.

The equipment of the module 50 may subsequently have certain pieces of electrical and/or electronic equipment added thereto (e.g., avionics computers) that are put into place on some of the shelves of the racks.

Pieces of equipment added to the module are connected together and to the pieces of equipment and the electrical and/or electronic systems (and also the ventilation systems) that were already incorporated in the module. All of the necessary connections (electricity, air) between the two submodules are pre-established before the module is installed, thereby presenting a considerable saving in time on the final assembly line. Thereafter, the module is connected overall to the electrical and/or electronic systems and to the ventilation provided on the primary fuselage structure of the aircraft via interface elements that are already present in the module.

It should be observed that the floor integral with the module also serves to convey transverse electrical connections (cables, . . . ) such as connections 160 shown in FIG. 2, between the two submodules.

Longitudinal electrical connections 162 are also installed in the lateral segments. Likewise, it is possible to provide lower connections under the floor between the two symmetrical submodules.

Figure 10:
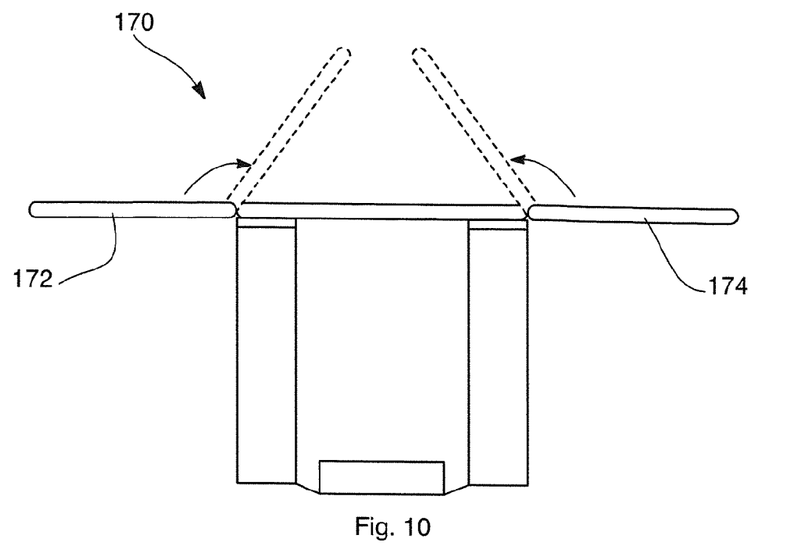
FIG. 10 is a diagrammatic cross-section view of a first variant embodiment of the FIG. 6a module.

A first variant of an avionics bay rack 170 is shown very diagrammatically in FIG. 10.

In this figure, the movable lateral floor segments 172, 174 integrated in the avionics bay module can be folded upwards from the deployed horizontal position.

They thus occupy an upside-down V-shaped folded position that is capable of being moved without interference inside a primary fuselage structure having a cabin height that is greater than that shown in FIGS. 7 and 8.

Figure 11:
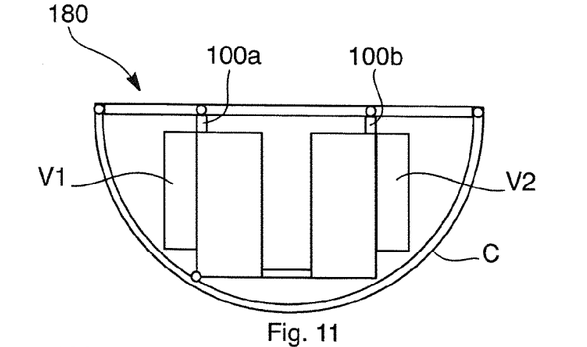
FIG. 11 is a diagrammatic cross-section view of a second variant embodiment of the FIG. 6a module.

FIG. 11 shows a second variant embodiment of the FIG. 6a avionics bay structure.

In this variant that has a module 180 in accordance with the module 50 and fastened to the fuselage frames C, the flexible intermediate supports 102a and 102b are omitted. There remain only the further-apart supports 100a and 100b.

References V1 and V2 designate respective volumes that are needed by the two submodules for housing all of the connections for interconnecting the electrical and/or electronic modules incorporated in each submodule. These volumes are also necessary for connections serving to interconnect these pieces of equipment and systems with the electrical and/or electronic systems present in the primary fuselage structure.

Figure 12:
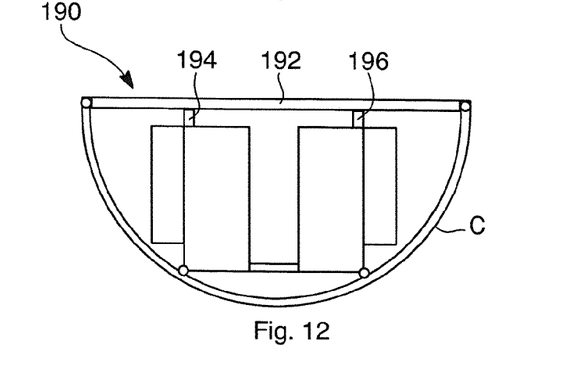
FIG. 12 is a diagrammatic cross-section view of a third variant embodiment of the FIG. 6a module.

FIG. 12 shows a third variant embodiment of a module 190 in which the central and lateral cross-members of FIG. 6a are replaced by a single one-piece cross-member 192 that extends continuously across the entire transverse dimension or width of the structure.

Support elements 194, 196 analogous to the support elements 100a and 100b are positioned in register with the outer edges of the racks for each one-piece cross-member 192.

Forces exerted on the cross-members of the module floor are taken up by the structural uprights (which are mechanically strong) of the racks. This makes it possible to reduce the height of the cross-members compared with an arrangement in which the cross-members are supported by structural rods situated on either side of the central racks.

The floor integral with the avionics bay structure and comprising a set of one-piece cross-members of the kind shown in FIG. 12 is not suitable for being hinged.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An avionics bay module, comprising an avionics bay structure with a longitudinal axis for installing in a single operation in a primary fuselage structure of an aircraft, the avionics bay structure having an integral floor in an upper portion of the avionics bay structure, wherein the floor has a top portion forming a surface for walking on and a bottom portion that is structural.

2. The avionics bay module according to claim 1, wherein the floor forms an integral portion of the upper portion of the structure of the avionics bay.

3. The avionics bay module according to claim 1, wherein the avionics bay structure has the floor integrated with its upper portion prior to being installed in the primary fuselage structure.

4. The avionics bay module according to claim 1, wherein the avionics bay structure comprises a plurality of elements fastened to one another so as to form an assembly that is suitable for being moved as a unit.

5. The avionics bay module according to claim 1, wherein the structural bottom portion comprises a set of cross-members, at least some of which that extend in a horizontal transverse direction are for connecting to the primary fuselage structure.

6. The avionics bay module according to claim 1, wherein the avionics bay structure incorporates an assembly of avionics racks receiving at least one of electrical and electronic equipment.

7. The avionics bay module according to claim 1, wherein the avionics bay structure presents a longitudinal dimension and a transverse dimension perpendicular to its height, the floor having in cross-section a plurality of floor segments including a central segment and two lateral segments arranged on either side of a horizontal central segment, each of the lateral segments being suitable for being hinged relative to the central segment in such a manner as to be capable of adopting firstly a horizontal, deployed position in which all of the segments are in alignment, and secondly a folded position in which each lateral segment forms an angle other than 180° with the central segment.

8. The avionics bay module according to claim 7 wherein the floor is fastened to each of the vertical transverse uprights of the two rows of racks via two support elements that are transversely spaced apart from each other, and wherein the floor is mounted to be supported on each of the vertical transverse uprights of the two rows of racks via its central segment.

9. The avionics bay module according to claim 1, wherein the avionics bay structure comprises two submodules supporting the floor and arranged on either side of a vertical midplane including the longitudinal axis of the avionics bay structure.

10. The avionics bay module according to claim 9, wherein the two submodules are separated from each other by a central passage with a longitudinal axis for access to the submodules.

11. The avionics bay module according to claim 9, wherein the avionics bay structure incorporates a vertical transverse partition fastened to the two submodules at one end of the two opposite longitudinal ends of said structure.

12. The avionics bay module according to claim 9, wherein each submodule comprises a row of avionics racks receiving at least one of electrical and electronic equipment in alignment along the longitudinal axis of the avionics bay structure, the two rows of racks being disposed facing each other and spaced apart from each other.

13. The avionics bay module according to claim 12, wherein each row of racks comprises a plurality of racks arranged side by side and spaced apart in pairs by structural vertical transverse support uprights, the transverse uprights of the two rows being respectively arranged facing one another.

14. The avionics bay module according to claim 13, wherein the floor is mounted to be supported on each of the vertical transverse uprights of the two rows of racks.

15. The avionics bay module according to claim 14, wherein the floor is fastened to each of the vertical transverse uprights of the two rows of racks via two support elements that are transversely spaced apart from each other.

16. The avionics bay module according to claim 15, wherein one of the two support elements is of the flexible support type and, of the two support elements, constitutes the support element that is closer to the flexible support element of the transverse upright facing the opposite row of racks.

17. An aircraft nose comprising a primary fuselage structure, the aircraft nose including an avionics bay module comprising an avionics bay structure incorporated inside the primary fuselage structure, the avionics bay structure having an integral floor in its top portion, wherein the floor has a top portion forming a surface for walking on and a bottom portion that is structural.

18. The aircraft nose according to claim 17, wherein the floor is integral with the top portion of the avionics bay structure.

19. The aircraft nose according to claim 17, wherein the floor is already integral with the avionics bay structure before that structure is installed in the primary fuselage structure.

20. The aircraft nose according claim 17, wherein inside the primary fuselage structure, there is an aircraft cabin floor that is locally interrupted, the avionics bay structure being incorporated in the primary fuselage structure in such a manner that the floor integral with said avionics bay structure locally extends the aircraft cabin floor.

21. The aircraft nose according to claim 17, wherein the avionics bay structure presents a longitudinal dimension and a transverse dimension perpendicular to its height, the floor integral with the avionics bay structure having in cross-section a plurality of floor segments including a central segment and two lateral segments arranged on either side of the central segment, each of the lateral segments being hinged relative to the central segment in such as a manner as to be capable of adopting firstly a horizontal deployed position in which all of the segments are in alignment, and secondly a folded position in which each lateral segment forms relative to the central segment an angle that is not equal to 180°.

22. The aircraft nose according to claim 17, wherein the primary fuselage structure has a plurality of fuselage frames arranged parallel to one another in cross-sections that are spaced apart along the longitudinal axis of the nose, the floor integral with the avionics bay structure including at least one cross-member in correspondence with a plurality of frames and, for each of the frames in the plurality of frames, at least one cross-member that extends in the same transverse direction as the frame and that connects together two opposite points of said frame.

23. The aircraft nose according to claim 22, wherein the avionics bay structure incorporates a set of avionics racks for receiving at least one of electrical and electronic equipment, said at least one cross-member in correspondence with each frame being fastened to one or more racks of the set of avionics racks.

24. The aircraft nose according to claim 23, wherein the set of avionics racks comprises a plurality of vertical transverse uprights each lying between two racks arranged side by side and each extending in the same transverse cross-section as one of the frames of the plurality of frames, said at least one cross-member in correspondence with said frame being fastened to the associated vertical transverse upright.

25. The aircraft nose according to claim 22, wherein the avionics bay structure presents a longitudinal dimension and a transverse dimension perpendicular to its height, the floor integral with the avionics bay structure having in cross-section a plurality of floor segments including a central segment and two lateral segments arranged on either side of the central segment, each of the lateral segments being hinged relative to the central segment in such as a manner as to be capable of adopting firstly a horizontal deployed position in which all of the segments are in alignment, and secondly a folded position in which each lateral segment forms relative to the central segment an angle that is not equal to 180°, and wherein, in the deployed position, the floor presents a transverse dimension corresponding substantially to the transverse dimension between the opposite inside edges of the fuselage frames to which the lateral floor segments are fastened.

26. A method of integrating an aircraft nose, the nose comprising a primary fuselage structure that defines a space for fitting out inside said structure, the space being opened at the rear end of the nose, the method comprising the following steps:

inserting avionics bay module in a longitudinal direction via the rear end of the nose, the module comprising an avionics bay structure that has a floor integral with its top portion, wherein the floor has a top portion forming a surface for walking on and a bottom portion that is structural;

moving the avionics bay module inside the primary fuselage structure towards the front end of the nose until reaching a location reserved for receiving said avionics bay module; and fastening the module to the primary fuselage structure.

27. The method according to claim 26, wherein, in cross-section, the floor integral with the avionics bay structure comprises a plurality of floor segments including a central segment and two lateral segments on either side of said horizontal central segment, each of the two lateral segments being hingeable relative to the central segment, the avionics bay module being inserted inside the nose with the two lateral segments folded into a position in which each of them forms relative to the central segment an angle that is not equal to 180°, the module being moved while in this position along a portion of its path.

28. The method according to claim 26, wherein, inside the primary fuselage structure, the aircraft nose includes an aircraft cabin floor that extends horizontally from the rear end of the nose towards the front end, the cabin floor being locally interrupted at a free end of the floor that is arranged at the rear of the location reserved for the avionics bay module.

29. The method according to claim 28, wherein the avionics bay module is moved:

horizontally over the cabin floor until it reaches a position situated beyond the free end of the floor and over an opening situated in register with the space reserved for said module; and then vertically through said opening in order to reach its location in which the floor integral with the avionics bay structure extends the cabin floor forwards.

30. The method according to claim 29, wherein during vertical movement of the avionics bay module, the method includes a step of deploying a plurality of lateral floor segments so that the lateral segments become aligned with the central segment.

* * * * *